(12) United States Patent
Morita

(10) Patent No.: US 8,346,323 B2
(45) Date of Patent: Jan. 1, 2013

(54) PORTABLE TERMINAL DEVICE

(75) Inventor: Masayoshi Morita, Tokyo (JP)

(73) Assignee: Sony Corporation (JP)

( * ) Notice: Subject to any disclaimer, the term of this patent is extended or adjusted under 35 U.S.C. 154(b) by 107 days.

(21) Appl. No.: 13/065,167

(22) Filed: Mar. 15, 2011

(65) Prior Publication Data

US 2011/0237304 A1    Sep. 29, 2011

(30) Foreign Application Priority Data

Mar. 23, 2010   (JP) ................................ P2010-066757

(51) Int. Cl.
*H04M 1/00* (2006.01)
(52) U.S. Cl. .................... 455/575.4; 455/90.3; 455/128; 455/347; 361/727; 361/679.39
(58) Field of Classification Search .... 455/575.1–575.4, 455/128, 347; 45/90.3; 361/679.38–679.39, 361/724–727
See application file for complete search history.

(56) References Cited

U.S. PATENT DOCUMENTS

| | | | |
|---|---|---|---|
| 2009/0029741 A1* | 1/2009 | Satou et al. | 455/566 |
| 2009/0082067 A1* | 3/2009 | Song | 455/566 |
| 2009/0147485 A1* | 6/2009 | Higashigawa et al. | 361/727 |

FOREIGN PATENT DOCUMENTS

JP    2006-157465 A    6/2006

\* cited by examiner

*Primary Examiner* — Wayne Cai
(74) *Attorney, Agent, or Firm* — Lerner, David, Littenberg, Krumholz & Mentlik, LLP

(57) ABSTRACT

A portable terminal device includes a first housing in which at least a display section is placed; a second housing in which at least an operation section is placed; a first circuit board on which a first connector is mounted; a second circuit board on which a second connector is mounted; and a connecting cable. A part of the first housing and a part of the second housing are placed one on top of another in a thickness direction. A first holding section and a second holding section are provided inside at least one of the first housing and the second housing, and when the first housing slides with respect to the second housing, a portion of the connecting cable between the first holding section and the second holding section is bent and extended.

6 Claims, 16 Drawing Sheets

PORTABLE TERMINAL DEVICE

CROSS-REFERENCE TO RELATED APPLICATION

The present application claims priority from Japanese Patent Application No. JP 2010-066757 filed in the Japanese Patent Office on Mar. 23, 2010, the entire content of which is incorporated herein by reference.

BACKGROUND OF THE INVENTION

1. Field of the Invention

The present invention relates to a technical field of a portable terminal device. More particularly, the present invention relates to a technical field which reduces the thickness or the like of the portable terminal device by causing part of a connecting cable to bend and extend in a direction which is orthogonal to a direction in which a first housing slides with respect to a second housing and is orthogonal to a thickness direction of the first housing and the second housing.

2. Description of the Related Art

Some portable terminal devices such as mobile telephones, voice recording and reproducing apparatuses, image recording and reproducing apparatuses, imaging apparatuses, information processors, and network communication apparatuses have a structure in which a first housing is caused to slide with respect to a second housing.

In some of such portable terminal devices such as mobile telephones, a display section is placed in the first housing, an operation section is placed in the second housing, at least part of the first housing and at least part of the second housing are placed one on top of another in a thickness direction, and the first housing slides with respect to the second housing in a direction orthogonal to the thickness direction (see, for example, Japanese Unexamined Patent Application Publication No. 2006-157465).

In a mobile telephone described in Japanese Unexamined Patent Application Publication No. 2006-157465, a circuit board is placed in the inside of each of the first housing and the second housing, and a connector mounted on one circuit board and a connector mounted on the other circuit board are connected to each other by a flexible printed wiring board provided as a connecting unit.

The flexible printed wiring board is placed inside the first housing and the second housing in a state in which the thickness direction thereof coincides with the thickness direction of the first housing and the second housing, and is bent or extended so as to be folded in the thickness direction when the first housing slides with respect to the second housing.

SUMMARY OF THE INVENTION

However, in the portable terminal device described in Japanese Unexamined Patent Application Publication No. 2006-157465, since the flexible printed wiring board is folded in the thickness direction when the first housing slides with respect to the second housing, it is necessary to prepare a space in which the flexible printed wiring board is folded in the thickness direction. This makes it difficult to reduce the thickness of the portable terminal device.

Moreover, part of the flexible printed wiring board is repeatedly and greatly bent or extended so as to be folded 180° each time the first housing slides with respect to the second housing and therefore the connecting unit is under heavy load. This lowers the durability of the connecting unit.

It is desirable to provide a portable terminal device which realizes a reduction in the thickness thereof, and improves the durability of the connecting unit.

According to an embodiment of the present invention, there is provided a portable terminal device, including: a first housing in which at least a display section is placed; a second housing supporting the first housing slidably in a predetermined direction and in which at least an operation section is placed; a first circuit board placed inside the first housing and on which a first connector is mounted; a second circuit board placed inside the second housing and on which a second connector is mounted; and a connecting cable placed inside the first housing and the second housing and having one end connected to the first connector and the other end connected to the second connector. At least part of the first housing and at least part of the second housing are placed one on top of another in a thickness direction. A first holding section and a second holding section are provided inside at least one of the first housing and the second housing so as to hold two portions in an intermediate section of the connecting cable away from each other in a direction in which the first housing slides with respect to the second housing. When the first housing slides with respect to the second housing, a portion of the connecting cable between the first holding section and the second holding section is bent and extended in a direction which is orthogonal to the direction in which the first housing slides and is orthogonal to the thickness direction.

Therefore, in the portable terminal device, there is not provided a space in which the connecting cable is bent in the thickness direction of the first housing and the second housing.

In the portable terminal device described above, it is preferable that the first housing be rotatably supported on the second housing in a plane orthogonal to the thickness direction, and a holding hole which holds the intermediate section of the connecting cable and functions as the second holding section be formed inside a rotation pivot section of the first housing with respect to the second housing.

By forming a holding hole inside the rotation pivot section of the first housing with respect to the second housing, the holding hole holding the intermediate section of the connecting cable and functioning as the second holding section, the bent state of the connecting cable is not changed when the first housing is being rotated with respect to the second housing.

In the portable terminal device described above, it is preferable that a cylindrical holding member having the holding hole be provided in the rotation pivot section, and the holding hole be inclined at a predetermined angle with respect to the thickness direction.

By providing a cylindrical holding member having the holding hole in the rotation pivot section and inclining the holding hole at a predetermined angle with respect to the thickness direction, the portion of the connecting cable, the portion being held by the holding hole, is held in a state in which the portion is located along the inclined surface.

In the portable terminal device described above, it is preferable that a storage concave section in which a portion of the connecting cable between the first holding section and the second holding section is stored be formed in one of the first housing and the second housing.

By forming a storage concave section in which a portion of the connecting cable between the first holding section and the second holding section is stored, a storage space in which the portion of the connecting cable between the first holding section and the second holding section is stored is limited to a given range.

In the portable terminal device described above, it is preferable that the length of the portion of the connecting cable, the portion being held by the first holding section and the second holding section, be 1.3 to 1.6 times the maximum stroke of the first housing when the first housing slides with respect to the second housing.

By setting the length of the portion of the connecting cable, the portion being held by the first holding section and the second holding section, at 1.3 to 1.6 times the maximum stroke of the first housing when the first housing slides with respect to the second housing, heavy load is not applied to the connecting cable in the entire range when the first housing slides.

In the portable terminal device described above, it is preferable that the first holding section and the second holding section be provided so as to be away from each other in a direction which is orthogonal to the direction in which the first housing slides and is orthogonal to the thickness direction.

By providing the first holding section and the second holding section so as to be away from each other in the direction which is orthogonal to the direction in which the first housing slides and is orthogonal to the thickness direction, a direction in which the connecting cable is bent is set in advance so as to be a predetermined direction.

A portable terminal device according to the embodiment of the present invention includes: a first housing in which at least a display section is placed; a second housing supporting the first housing slidably in a predetermined direction and in which at least an operation section is placed; a first circuit board placed inside the first housing and on which a first connector is mounted; a second circuit board placed inside the second housing and on which a second connector is mounted; and a connecting cable placed inside the first housing and the second housing and having one end connected to the first connector and the other end connected to the second connector. At least part of the first housing and at least part of the second housing are placed one on top of another in a thickness direction. A first holding section and a second holding section are provided inside at least one of the first housing and the second housing so as to hold two portions in an intermediate section of the connecting cable away from each other in a direction in which the first housing slides with respect to the second housing. When the first housing slides with respect to the second housing, a portion of the connecting cable between the first holding section and the second holding section is bent and extended in a direction which is orthogonal to the direction in which the first housing slides and is orthogonal to the thickness direction.

Therefore, it is not necessary to prepare a space in which the connecting cable is bent in the thickness direction of the first housing and the second housing. This makes it possible to reduce the thickness of the portable terminal device.

Moreover, the connecting cable is not folded or extended greatly in the thickness direction of the first housing and the second housing each time the first housing slides. This makes it possible to improve the durability of the connecting cable.

According to another embodiment of the present invention, the first housing is rotatably supported on the second housing in a plane orthogonal to the thickness direction, and a holding hole holding the intermediate section of the connecting cable and functioning as the second holding section is formed inside a rotation pivot section of the first housing with respect to the second housing.

Therefore, in a case in which the first housing is rotated with respect to the second housing, it is possible to reduce the thickness of the portable terminal device and improve the durability of the connecting cable.

According to still another embodiment of the present invention, a cylindrical holding member having the holding hole is provided in the rotation pivot section, and the holding hole is inclined at a predetermined angle with respect to the thickness direction.

Therefore, it is possible to set a direction in which the connecting cable is bent when the first housing slides with respect to the second housing at a given direction with reliability.

According to yet another embodiment of the present invention, a storage concave section in which a portion of the connecting cable between the first holding section and the second holding section is stored is formed in one of the first housing and the second housing.

Therefore, the storage space in which the portion of the connecting cable between the first holding section and the second holding section is stored is limited to a given range. This makes it possible to reduce the size of the portable terminal device.

According to yet another embodiment of the present invention, the length of the portion of the connecting cable, the portion being held by the first holding section and the second holding section, is 1.3 to 1.6 times the maximum stroke of the first housing when the first housing slides with respect to the second housing.

Therefore, it is possible to ensure a good storage state of the connecting cable without applying heavy load to the connecting cable in the entire range when the first housing slides.

According to yet another embodiment of the present invention, the first holding section and the second holding section are provided so as to be away from each other in a direction which is orthogonal to the direction in which the first housing slides and is orthogonal to the thickness direction.

Therefore, a direction in which the connecting cable is bent can be set in advance so as to be a predetermined direction. This makes it possible to set the direction in which the connecting cable is bent at a given direction with reliability.

DESCRIPTION OF THE PREFERRED EMBODIMENTS

Figure 1:
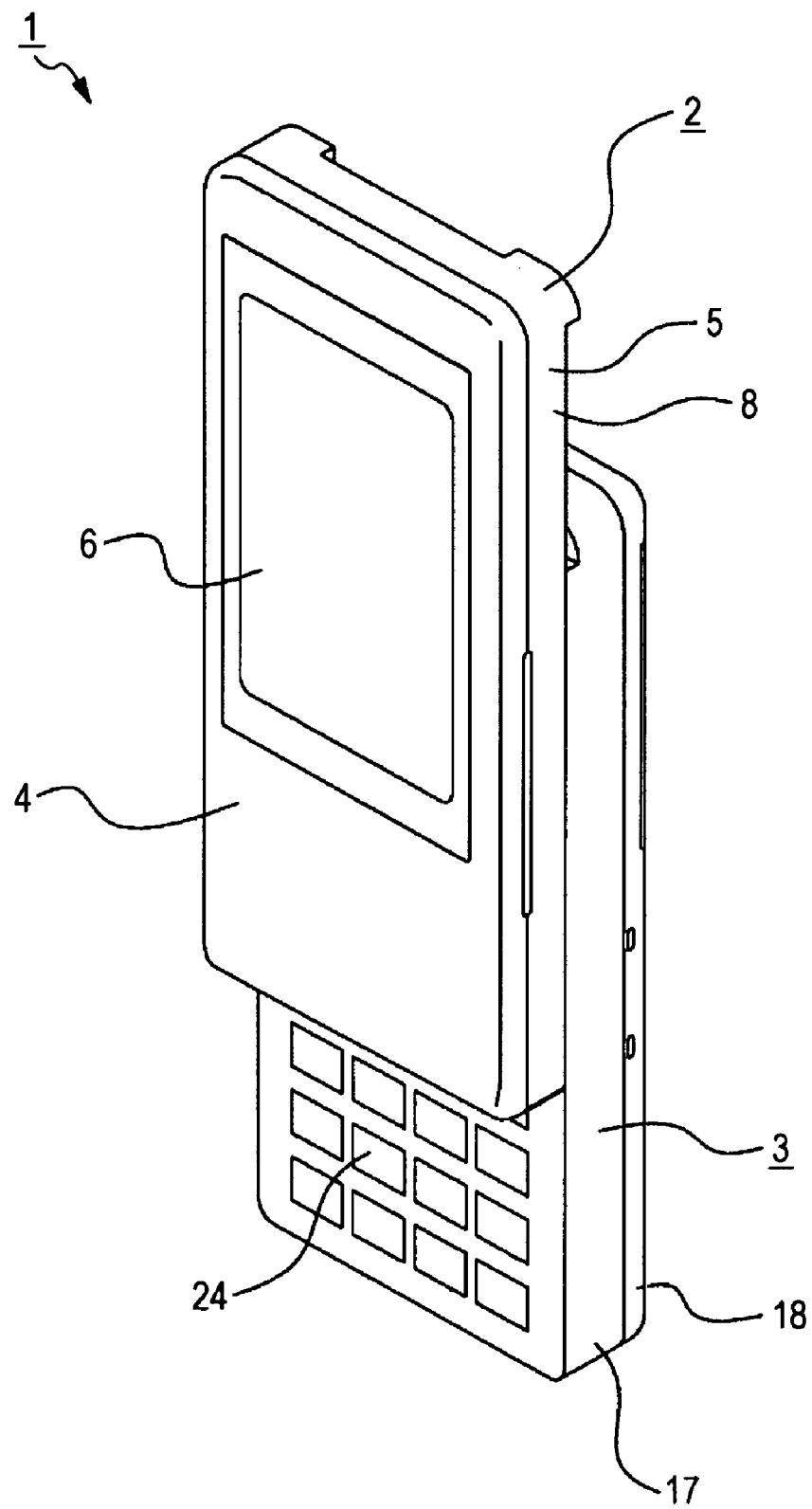
FIG. 1 shows a portable terminal device according to an embodiment of the present invention together with FIGS. 2 to 18 and is a perspective view of the portable terminal device.

Hereinafter, a portable terminal device according to an embodiment of the present invention will be described with reference to the accompanying drawings.

In the embodiment of the present invention described below, the portable terminal device is applied to a mobile telephone.

It is to be noted that the application of the present invention is not limited to a mobile telephone. The present invention can be widely applied to other various types of portable terminal devices in which a first housing is configured so as to be slidable with respect to a second housing. Examples of the portable terminal device include voice recording and reproducing apparatuses, image recording and reproducing apparatuses, imaging apparatuses such as cameras, network communication apparatuses, information processors such as personal computers and PDAs (personal digital assistants), and the like.

In the following description, a side on which the first housing is located is referred to as a front, a side on which the second housing is located is referred to as a back, and a front-back direction, a vertical direction, and a horizontal direction are indicated by defining a direction in which the first housing slides with respect to the second housing as a vertical direction.

The front-back direction, the vertical direction, and the horizontal direction used below are given for convenience of description, and embodiments of the present invention are not restricted to these directions.

Overall Structure of Portable Terminal Device

A portable terminal device (mobile telephone) 1 has a first housing 2 and a second housing 3 (see FIGS. 1 to 4). Both the first housing 2 and the second housing 3 are formed in the shape of a vertically long rectangle, and the thickness direction thereof is the front-back direction.

The first housing 2 is formed of a cover body 4 and a base body 5 which are connected together with the cover body 4 placed in the front and the base body 5 placed in the back.

The cover body 4 is formed in the shape of a shallow box having an opening in the back, and a display section 6 is placed in the cover body 4.

The base body 5 is formed of a base section 7 facing in the front-back direction and a frame-shaped section 8 provided on the outer edge of the base section 7, the base section 7 and the frame-shaped section 8 which are integrally formed. On the front face of the base section 7, a first placement concave section 9 is formed. The first placement concave section 9 is enclosed with the front face of the base section 7 and a front end part of the frame-shaped section 8 and has an opening in the front side thereof. On the back face of the base section 7, a second placement concave section 10 is formed. The second placement concave section 10 is enclosed with the back face of the base section 7 and a back end part of the frame-shaped section 8 and has an opening in the back side.

Inside the base section 7, a shallow storage concave section 11 having an open front side is formed. In the storage concave section 11, a cable insertion hole 11a which penetrates the center of the storage concave section 11 in the horizontal direction from the front to the back and extends vertically is formed.

At a lower end part of the base section 7, a shallow concave section 12 having an open front side is formed. In the base section 7, a holding groove 13 having an open front side is formed between the storage concave section 11 and the concave section 12, and an upper end of the holding groove 13 is communicated with the storage concave section 11 and a lower end thereof is communicated with the concave section 12 (see FIGS. 5 and 6).

Figure 5:
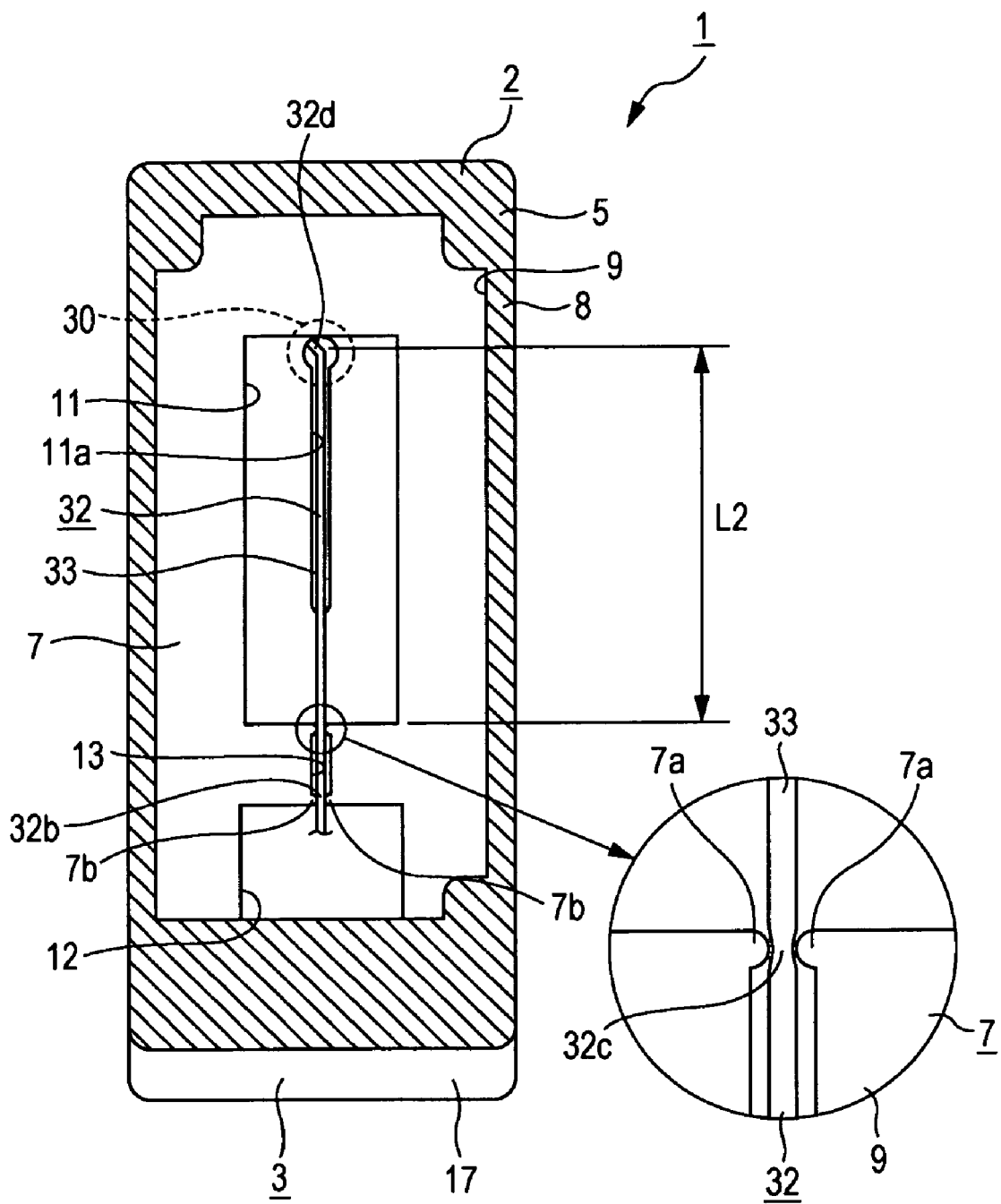
FIG. 5 is a front view of the portable terminal device, part of which is shown in cross section, in a state in which the first housing is in a closing position.
Figure 6:
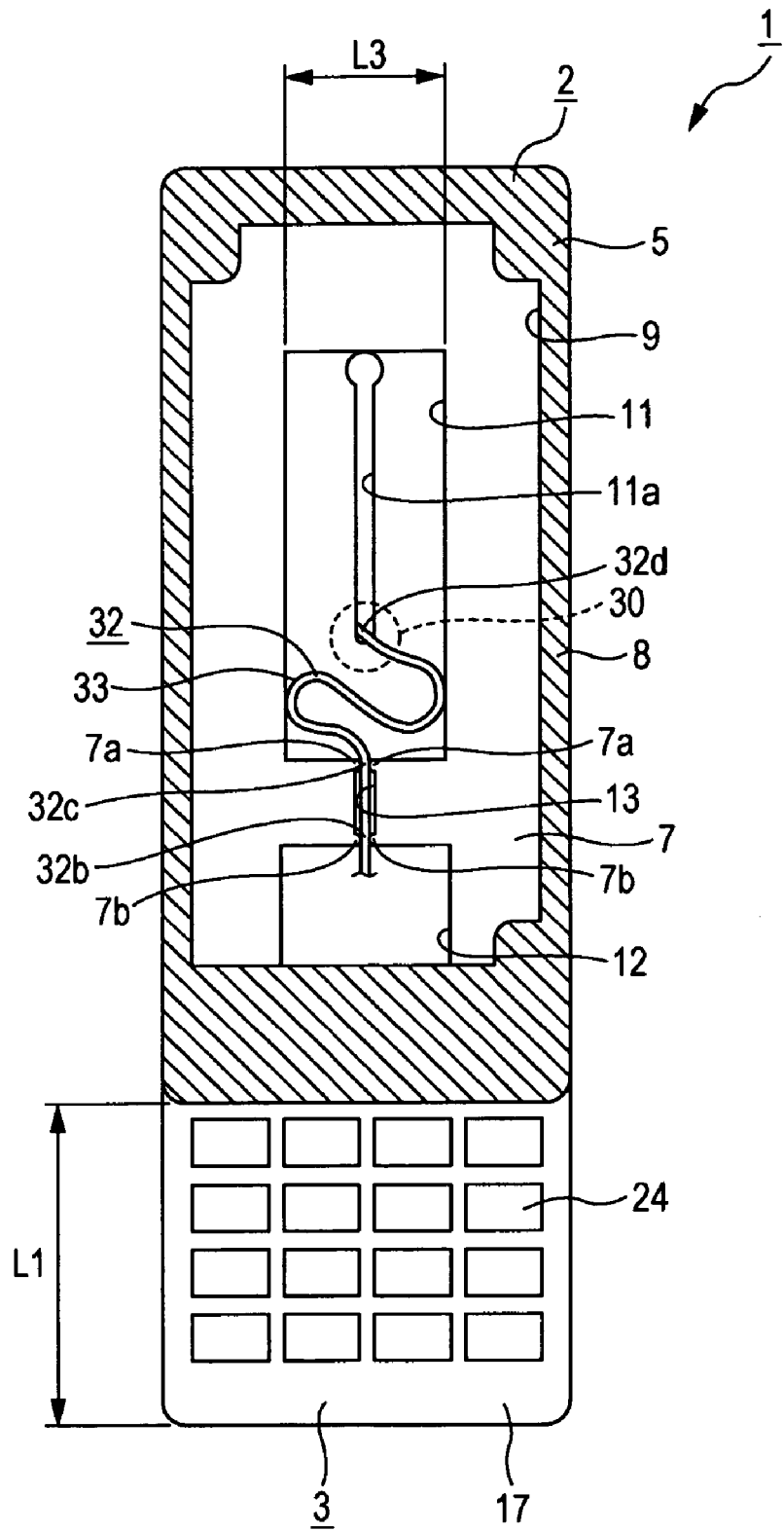
FIG. 6 is a front view of the portable terminal device, part of which is shown in cross section, in a state in which the first housing is in an opening position.

In the base section 7, as shown in FIGS. 5 and 6, first holding sections 7a and 7a projecting in a direction in which the first holding sections 7a and 7a make contact with each other are provided in an upper end part of the holding groove 13. In the base section 7, holding projecting sections 7b and 7b projecting in a direction in which the holding projecting sections 7b and 7b make contact with each other are provided in a lower end part of the holding groove 13. The first holding sections 7a and 7a and the holding projecting sections 7b and 7b are each formed in the shape of, for example, a semicircle which is convex in a direction in which they project.

Figure 2:
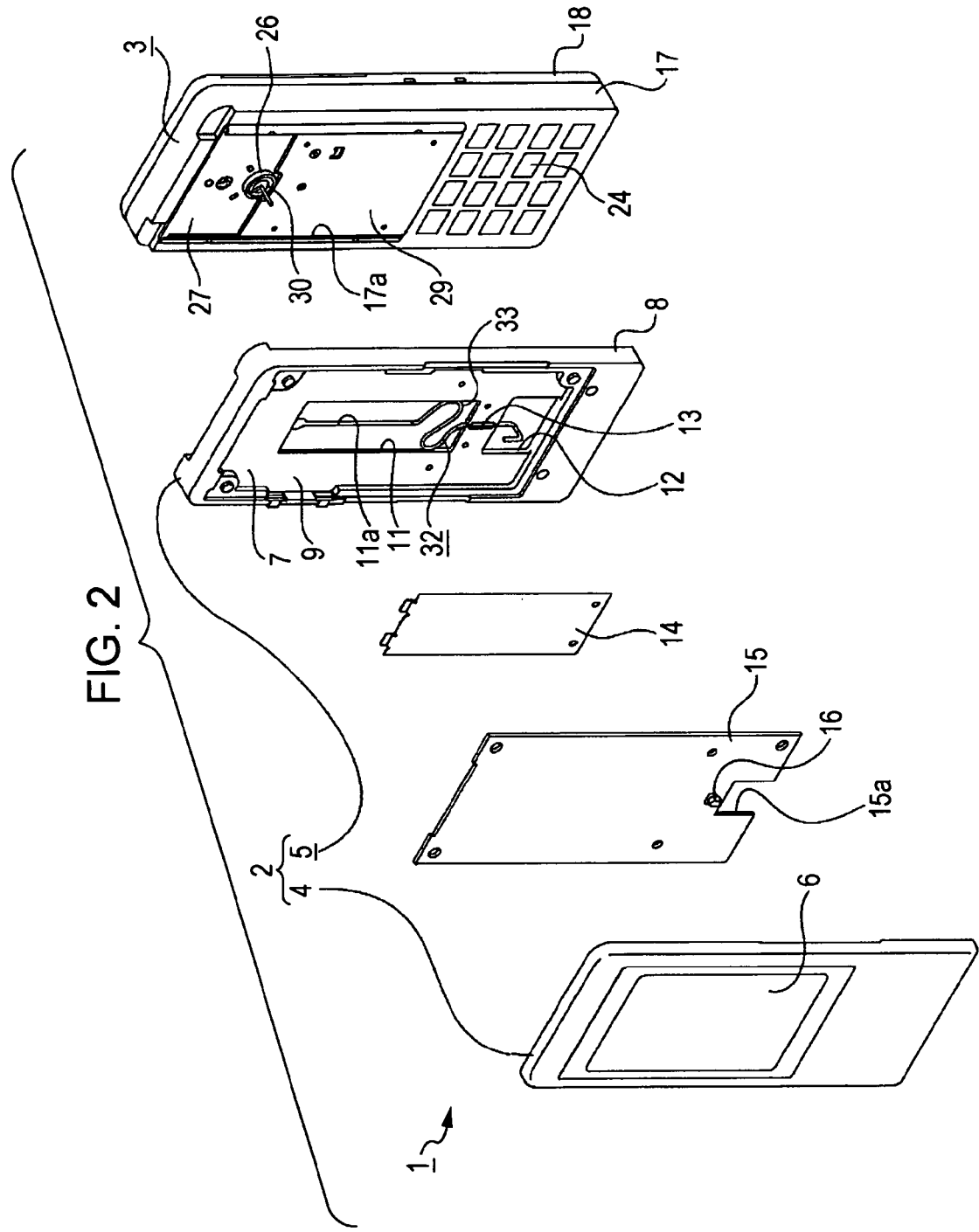
FIG. 2 is an exploded perspective view of the portable terminal device.
Figure 3:
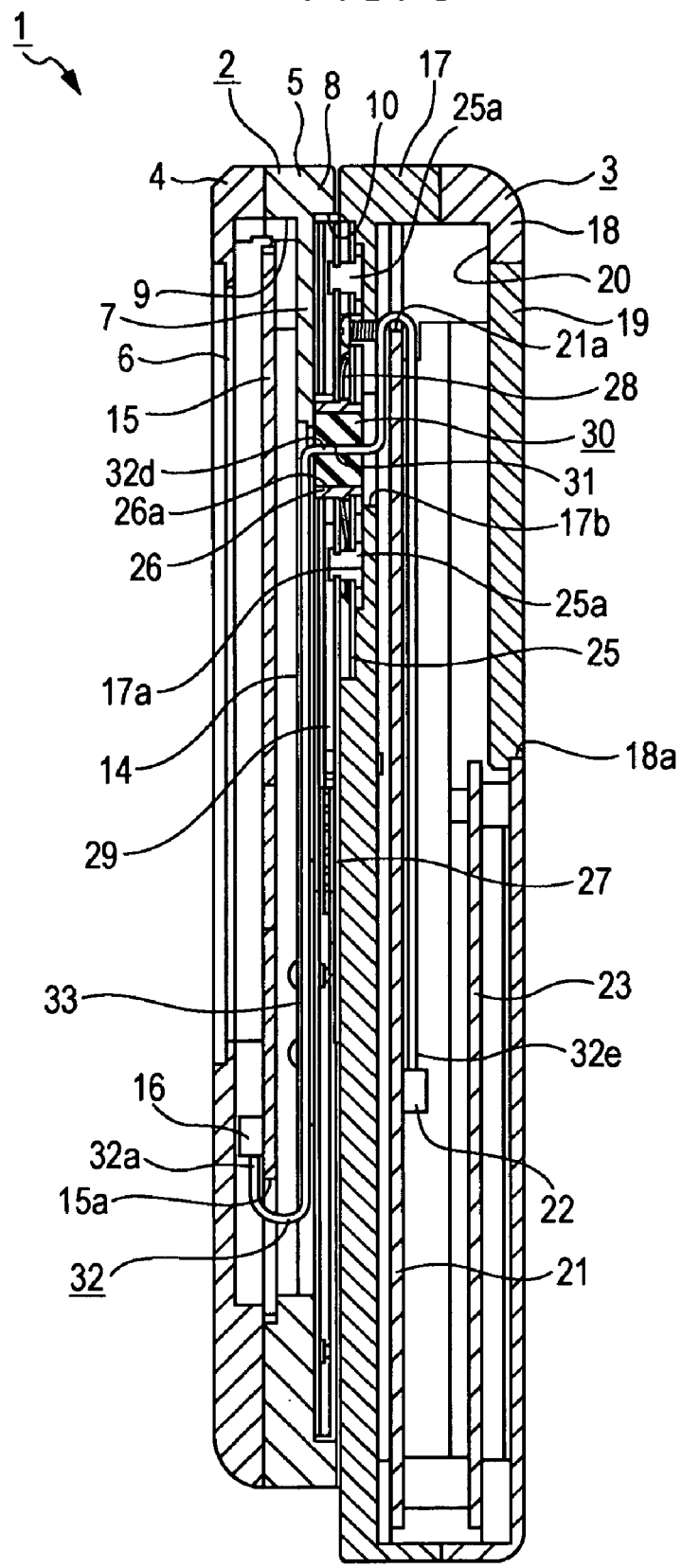
FIG. 3 is a sectional view of the portable terminal device in a state in which a first housing is in a closing position.
Figure 4:
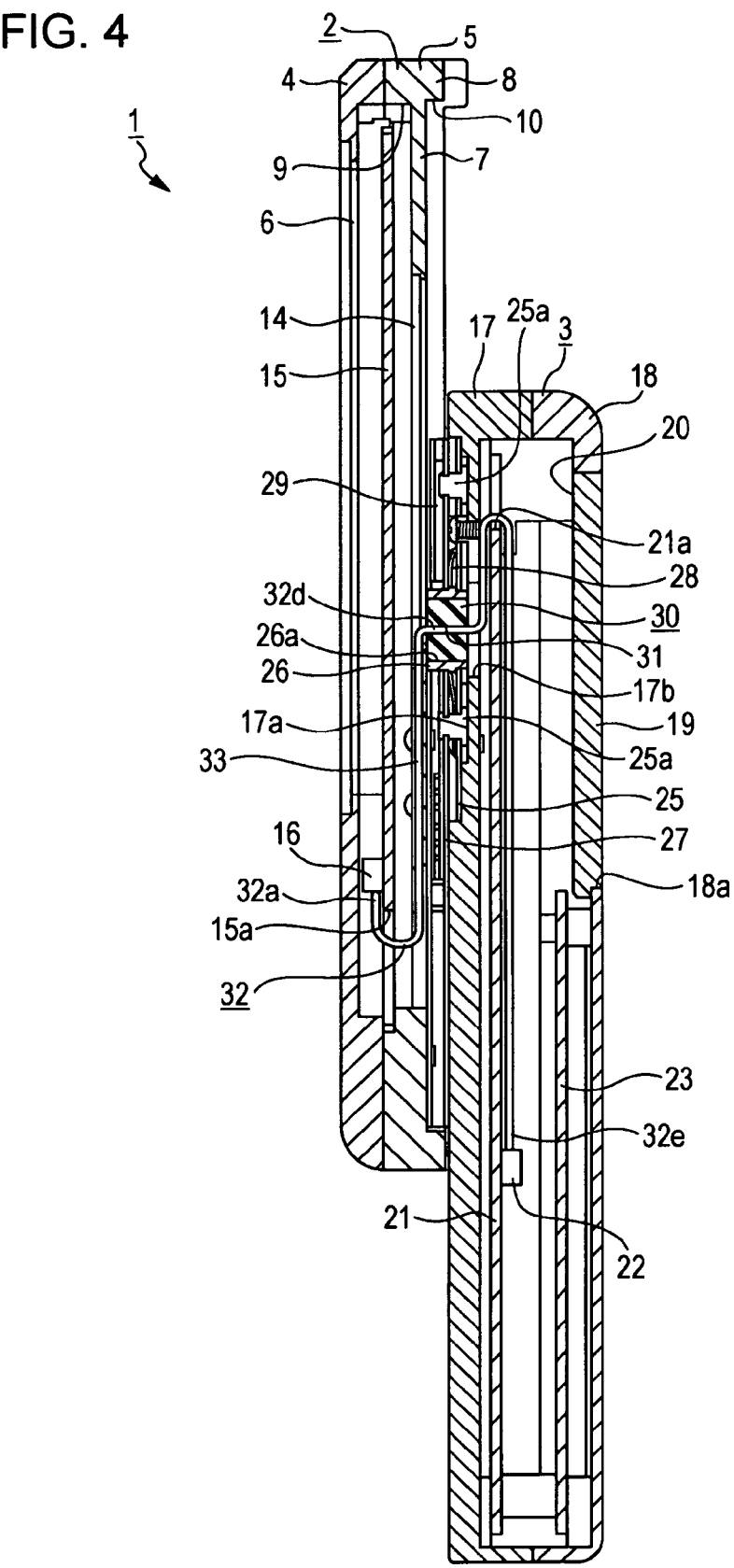
FIG. 4 is a sectional view of the portable terminal device in a state in which the first housing is an opening position.

To the base section 7, a sheet-shaped retainer plate 14 which closes the storage concave section 11 from the front side is attached (see FIGS. 2 to 4).

In the first placement concave section 9 of the base body 5, a first circuit board 15 is placed and attached. In a lower end part of the first circuit board 15, an insertion notch 15a having an opening in the lower part thereof is formed. On the front face of the first circuit board 15, a first connector 16 is mounted in a position immediately above the insertion notch 15a.

The second housing 3 is formed of a front-side case 17, a back-side case 18, and a lid body 19 (see FIGS. 1 to 4).

The front-side case 17 is formed in the shape of a box having an opening in the back, and has, on the upper end side thereof, a mounting concave section 17a having an opening in the front side and an insertion hole 17b which penetrates the front-side case 17 from the front to the back.

The back-side case 18 is formed in the shape of a box having an opening in the front, and has, on the upper end side thereof, a communicating hole 18a which penetrates the back-side case 18 from the front to the back. The communicating hole 18a of the back-side case 18 is closed by the lid body 19.

As a result of the front-side case 17 located in the front and the back-side case 18 located in the back being connected together in a state in which the communicating hole 18a of the back-side case 18 is closed by the lid body 19, a placement space 20 is internally formed (see FIGS. 3 and 4).

A second circuit board 21 is placed in the placement space 20 on a front end side thereof, and a second connector 22 is mounted on the back face of the second circuit board 21. In an upper end part of the second circuit board 21, an insertion notch 21a having an opening in an upper part thereof is formed. A third circuit board 23 is placed in the placement space 20 on a back end side thereof.

On a lower end side of the front-side case 17, an operation section 24 formed of a plurality of operation buttons, for example, is placed. In addition to the second housing 3, the operation section 24 may be placed in the first housing 2.

To the front-side case 17, a rotatable base 25 placed in the mounting concave section 17a is attached. The rotatable base 25 is formed in the shape of a plate facing in the front-back direction and is mounted on the mounting concave section 17a by mounting pins 25a and 25a.

A cylindrical sleeve 26 is attached to the rotatable base 25, and a hole of the sleeve 26 is formed as a placement hole 26a.

Figure 7:
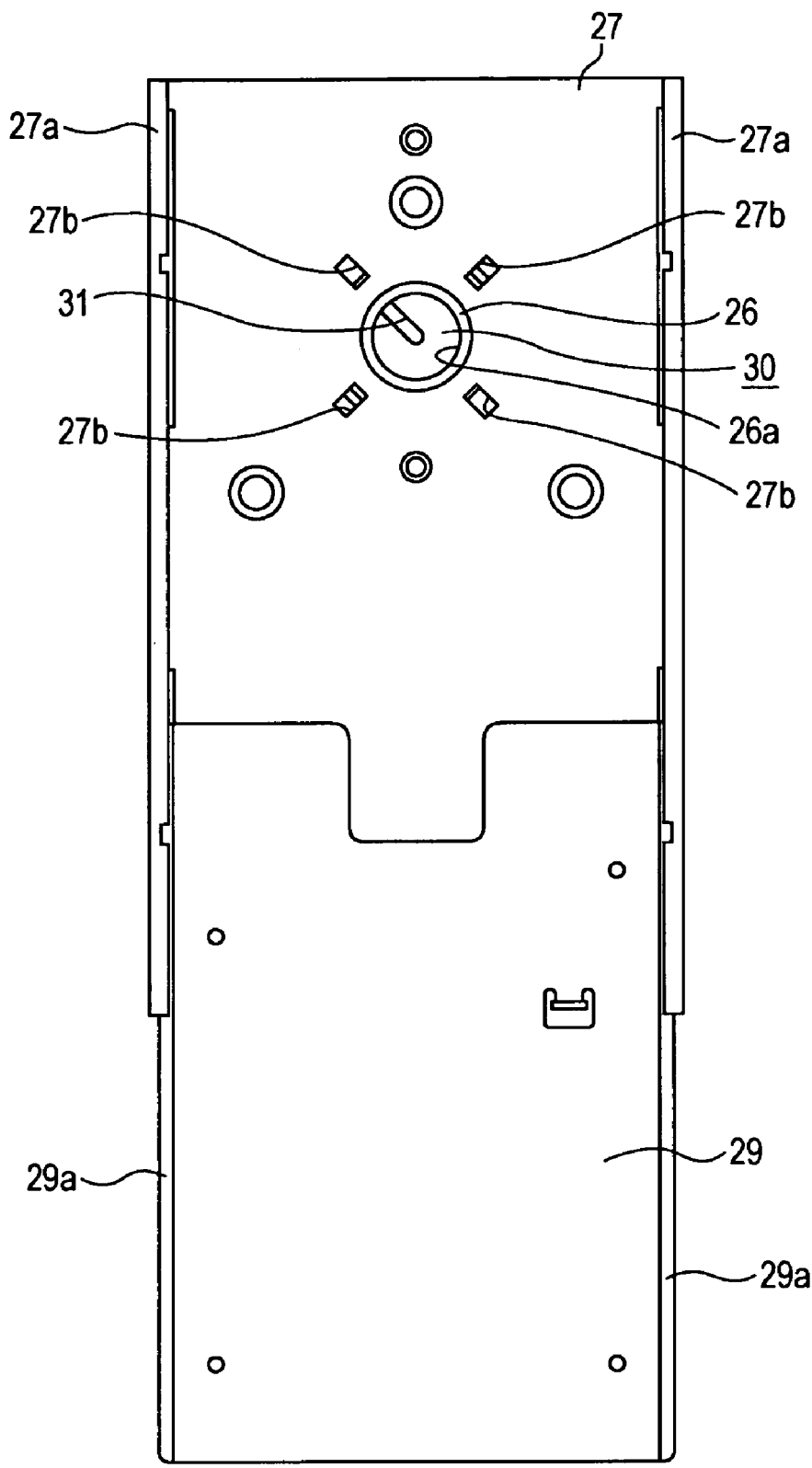
FIG. 7 is an enlarged front view of a slide base and a slider in a state in which the first housing is in a closing position.
Figure 8:
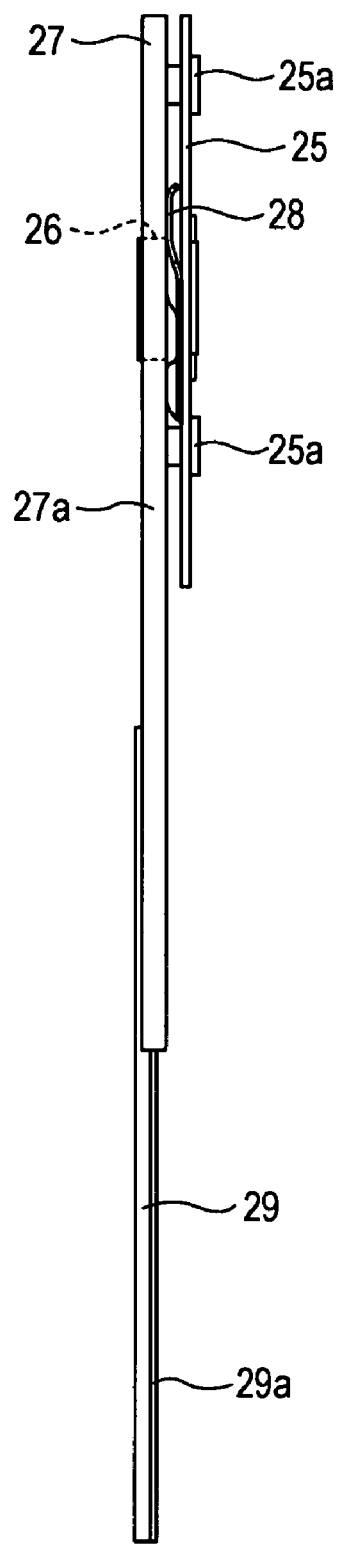
FIG. 8 is an enlarged side view of the slide base and the slider in a state in which the first housing is in an opening position.

A slide base 27 is rotatably supported on the sleeve 26 (see FIGS. 7 and 8). The slide base 27 is formed in the shape of a vertically long rectangle and has guide rails 27a and 27a on the right and left sides thereof. The guide rails 27a and 27a are each formed in the shape of the letter U which is opened inward. In the slide base 27, engagement holes 27b, 27b, . . . are circumferentially formed at intervals in positions around a part supported by the sleeve 26.

Between the back face of the slide base 27 and the front face of the rotatable base 25, a click spring 28 is placed.

A slider 29 is supported on the slide base 27 so as to be vertically slidable. The slider 29 is formed in the shape of a vertically long rectangle, and the right and left side parts thereof are provided as guided sections 29a and 29a. The slider 29 is slidably supported on the slide base 27 as a result of the guided sections 29a and 29a being slidably engaged in the guide rails 27a and 27a.

The slider 29 is placed and attached to the second placement concave section 10 formed in the base body 5 of the first housing 2.

A holding member 30 is attached by being placed through the placement hole 26a of the sleeve 26 attached to the front-side case 17 of the second housing 3 (see FIGS. 3 and 4). The holding member 30 is formed of material having a high elastic modulus, such as urethane rubber.

Figure 9:
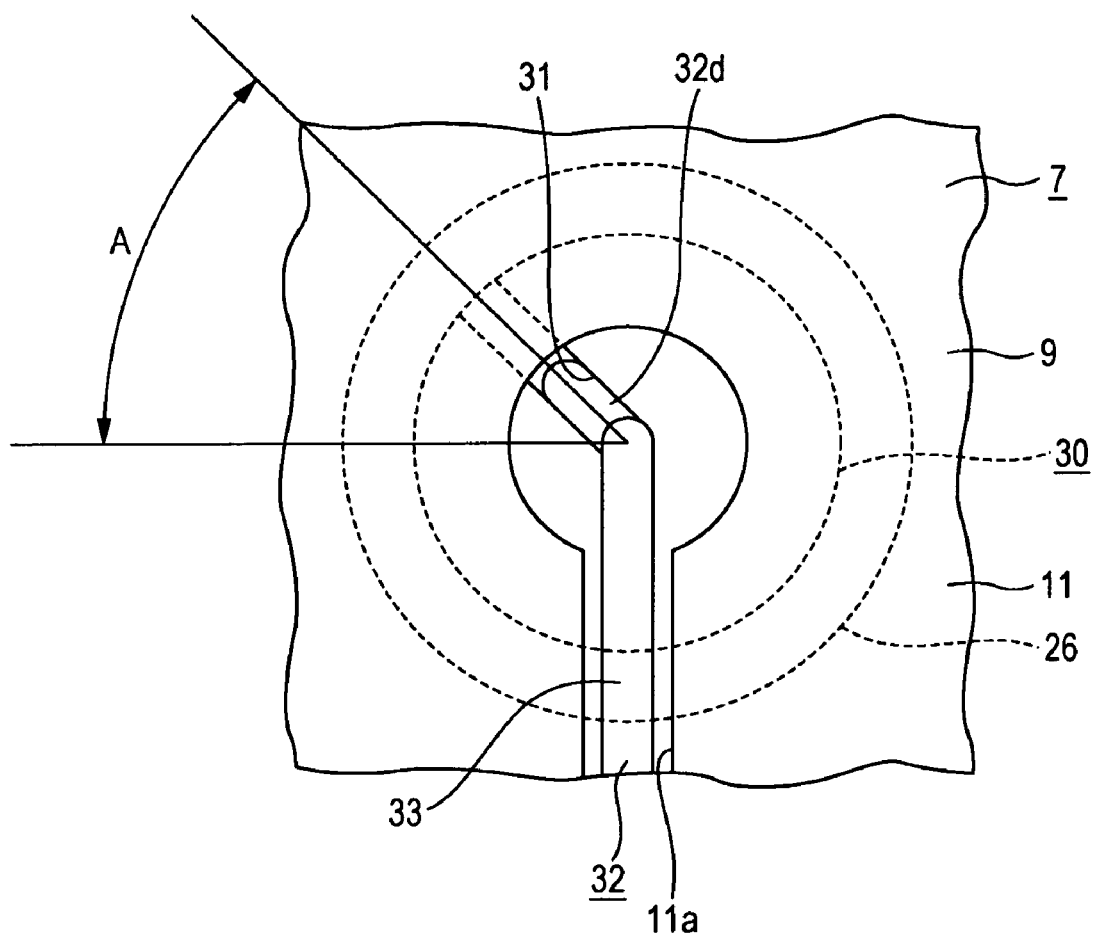
FIG. 9 is an enlarged front view showing a holding member and other portions.
Figure 10:
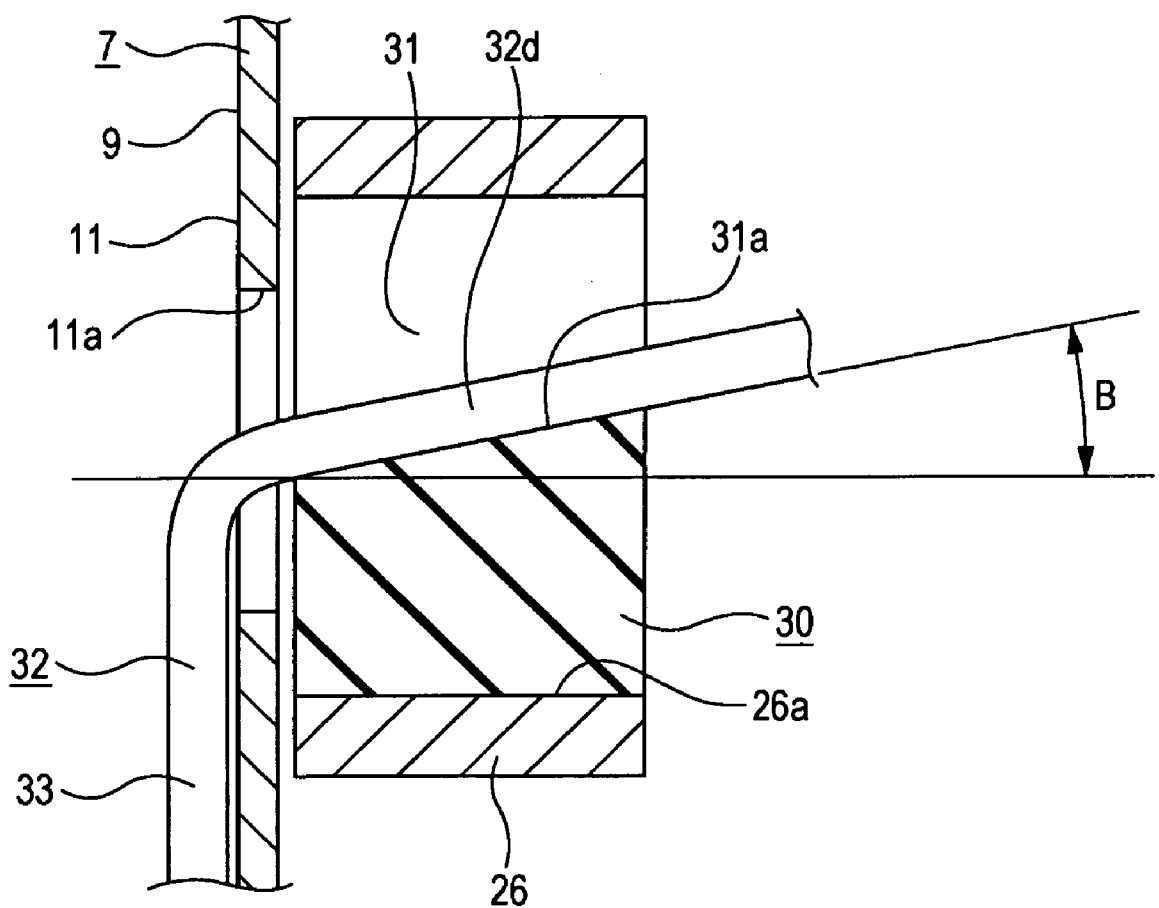
FIG. 10 is an enlarged sectional view showing the holding member and other portions.

The holding member 30 has a cylindrical outside shape and has a holding hole 31 which extends from a center in a radial direction, for example, obliquely upward and leftward, that is, upward at an angle A with respect to a horizontal line (see FIG. 9). The angle A is set at 20° to 40°, for example. The holding hole 31 is formed on an outer circumferential surface of the holding member 30, for example, and an innermost inner surface thereof is formed as an inclined surface 31a inclined with respect to an axial direction of the holding member 30. The inclined surface 31a is inclined at an angle B with respect to the axial direction so as to be displaced obliquely upward and leftward as the inclined surface 31a extends backward (see FIG. 10).

The first connector 16 mounted on the first circuit board 15 placed inside the first housing 2 and the second connector 22 mounted on the second circuit board 21 placed inside the second housing 3 are connected to each other by a connecting cable 32 (see FIGS. 3 and 4).

One end 32a of the connecting cable 32 is connected to the first connector 16, the connecting cable 32 is placed through the insertion notch 15a of the first circuit board 15 (see FIGS. 3 and 4), and intermediate sections 32b and 32c thereof are held by the holding projecting sections 7b and 7b and the first holding sections 7a and 7a, respectively, of the first housing 2 (see FIGS. 5 and 6). The diameter of the connecting cable 32 is made slightly greater than the distance between the holding projecting sections 7b and 7b and the distance between the first holding sections 7a and 7a, and the intermediate sections 32b and 32c which are inserted between the holding projecting sections 7b and 7b and the first holding sections 7a and 7a, respectively, are held in a state in which the intermediate sections 32b and 32c are elastically deformed (see an enlarged view of FIG. 5).

The connecting cable 32 is held in a state in which a part thereof located above the intermediate section 32c is stored in the storage concave section 11 of the first housing 2. The part of the connecting cable 32, the part being stored in the storage concave section 11, is provided as a bendable section 33. The connecting cable 32 is inserted into the cable insertion hole 11a, and an intermediate section 32d is held in the holding hole 31 of the holding member 30 (see FIGS. 9 and 10). As described above, the holding hole 31 of the holding member 30 has the function of holding the connecting cable 32, and the holding hole 31 is formed as a second holding section holding the connecting cable 32.

The diameter of the connecting cable 32 is made slightly greater than the width of the holding hole 31, and the intermediate section 32d inserted into the holding hole 31 is held in a state in which the intermediate section 32d is elastically deformed. At this time, the intermediate section 32d of the connecting cable 32 is held in a state in which the intermediate section 32d is located along the inclined surface 31a of the holding hole 31.

A part of the connecting cable 32, the part projecting backward from the holding hole 31 of the holding member 30, is placed through the insertion hole 17b and through the insertion notch 21a of the second circuit board 21 (see FIGS. 3 and 4), and the other end 32e of the connecting cable 32 is connected to the second connector 22.

In the portable terminal device 1, as mentioned earlier, the slider 29 slidably supported on the slide base 27 is attached to the first housing 2, and the first housing 2 is vertically slidable with respect to the second housing 3 (see FIGS. 3 to 6). The first housing 2 slides between a closing position (see FIGS. 3 and 5) in which the whole of the first housing 2 is placed on the second housing 3 in a thickness direction and the first housing 2 closes the operation section 24 and an opening position (see FIGS. 4 and 6) in which the upper end part thereof projects upward from the second housing 3 and opens the operation section 24.

When the displacement (maximum stroke) between the closing position and the opening position of the first housing 2 is L1 (see FIG. 6) and the length of the bendable section 33 which is the part of the connecting cable 32, the part being placed in the storage concave section 11, is L2 (see FIG. 5), L2 is set so as to be 1.3 to 1.6 times L1.

Moreover, when the width of the storage concave section 11 in a horizontal direction is L3 (see FIG. 6), L1 is set so as to be 2.5 to 3.0 times L3.

Basic Operation of Portable Terminal Device

Figure 11:
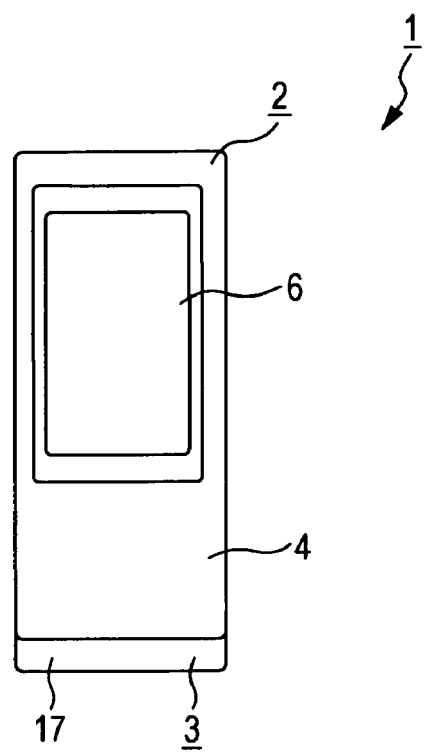
FIG. 11 shows the operation of the portable terminal device together with FIGS. 12 to 14 and is a front view showing a state in which the first housing is in a closing position.
Figure 12:
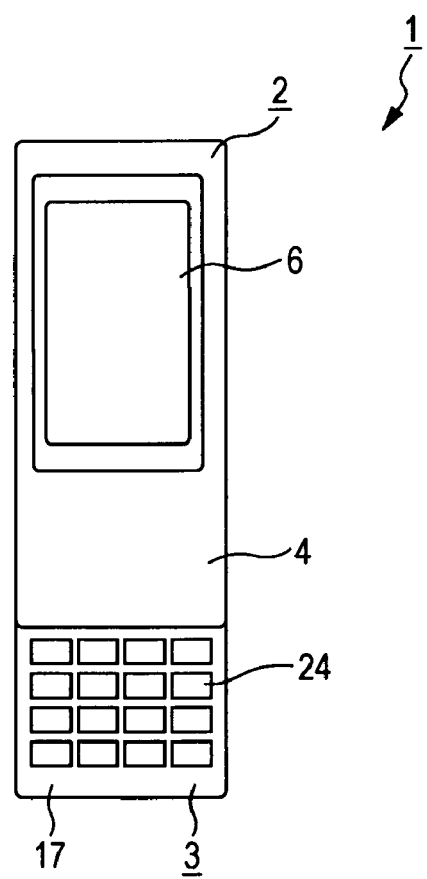
FIG. 12 is a front view showing a state in which the first housing slides to an opening position.

As described earlier, in the portable terminal device 1, the first housing 2 is slidably supported on the second housing 3, and the first housing 2 slides with respect to the second housing 3 between the closing position in which the first housing 2 closes the operation section 24 and the opening position in which the first housing 2 opens the operation section 24 (see FIGS. 11 and 12).

Figure 13:
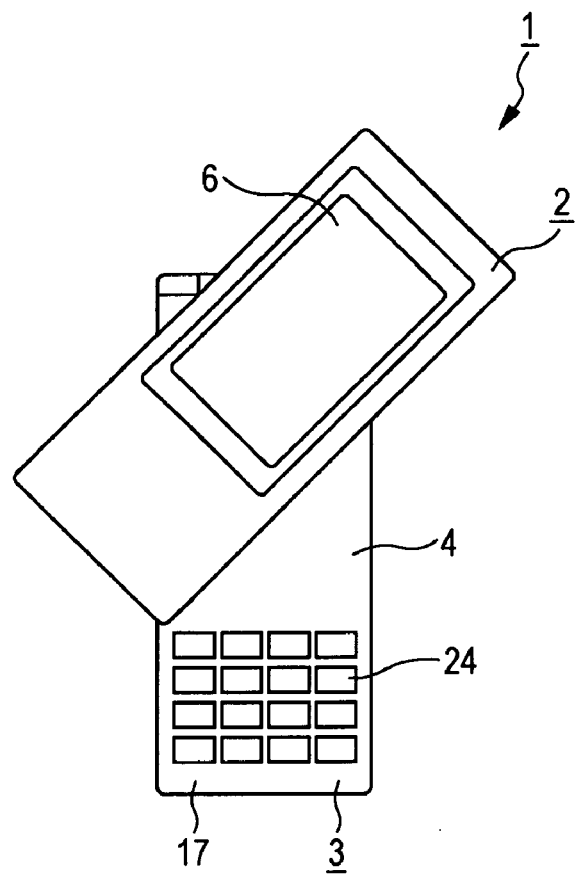
FIG. 13 is a front view showing a state in which the first housing is being rotated between an opening position and a rotational position.
Figure 14:
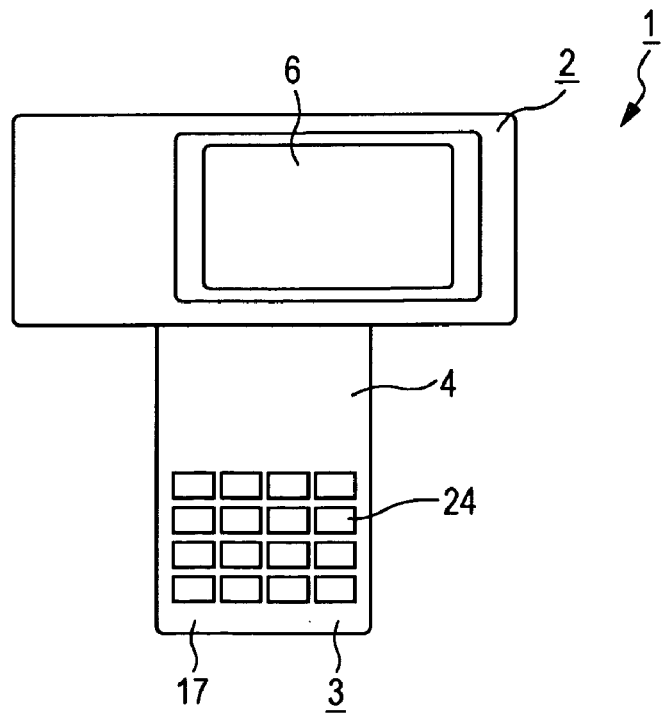
FIG. 14 is a front view showing a state in which the first housing is rotated to a rotational position.

Moreover, in the opening position, the first housing 2 is rotatable with respect to the second housing 3 in a plane orthogonal to the thickness direction by using, as a pivot section, the sleeve 26 and the holding member 30 placed inside the sleeve 26 (see FIGS. 13 and 14). Therefore, the sleeve 26 and the holding member 30 function as a rotation pivot section of the first housing 2 with respect to the second housing 3.

The first housing 2 can rotate to a rotational position (see FIG. 14) which is orthogonal to the second housing 3.

State of Connecting Cable when Portable Terminal Device is Operated

Next, a state of the connecting cable 32 when the portable terminal device 1 slides and a state of the connecting cable 32 when the portable terminal device 1 is rotated will be described.

When the first housing 2 is in the closing position in which the first housing 2 closes the operation section 24, as shown in FIGS. 3 and 5, the bendable section 33 of the connecting cable 32 is extended in the storage concave section 11 and is in the form of a vertical straight line.

At this time, part of the click spring 28 engages into the engagement holes 27b, 27b, . . . of the slide base 27, and the first housing 2 is held in the closing position.

Figure 15:
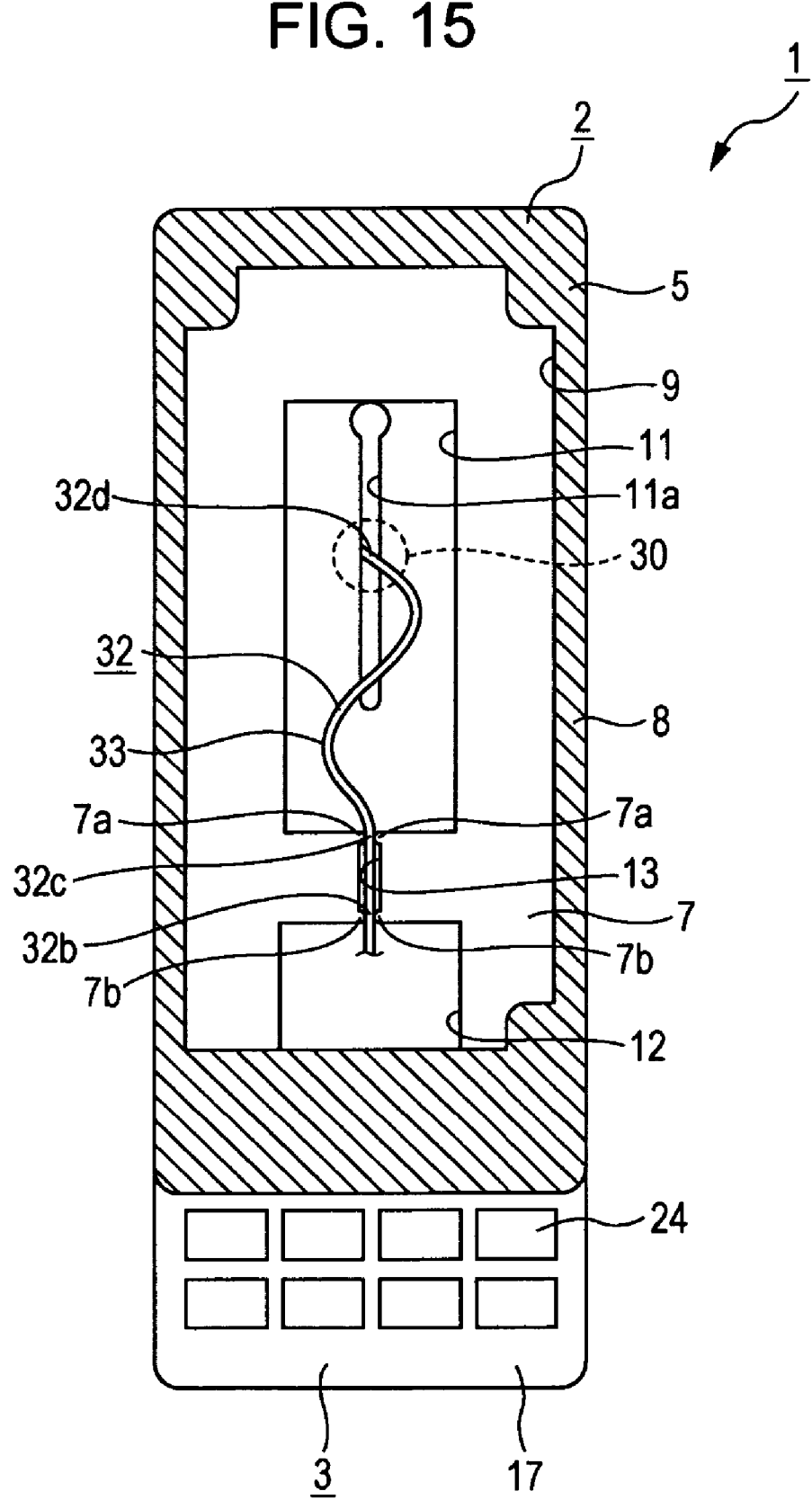
FIG. 15 is a front view showing the portable terminal device in a state in which a connecting cable is bent when the first housing slides and showing part of the first housing in cross section.

When the first housing 2 starts to slide with respect to the second housing 3 from the closing position to the opening position, the intermediate section 32c held by the first holding sections 7a and 7a of the connecting cable 32 is moved upward. As a result, the bendable section 33 starts to be bent so as to meander (see FIG. 15). At this time, since the holding hole 31 of the holding member 30 is made to extend obliquely upward and leftward and has the inclined surface 31a, the upper end part of the bendable section 33 is bent so as to extend in a direction along the inclined surface 31a of the holding hole 31. Therefore, the upper end part of the bendable section 33 is bent so as to be diagonally inclined rightward, and the whole of the bendable section 33 is bent inside the storage concave section 11 as if the letter S were written (see FIGS. 4 and 6).

Figure 16:
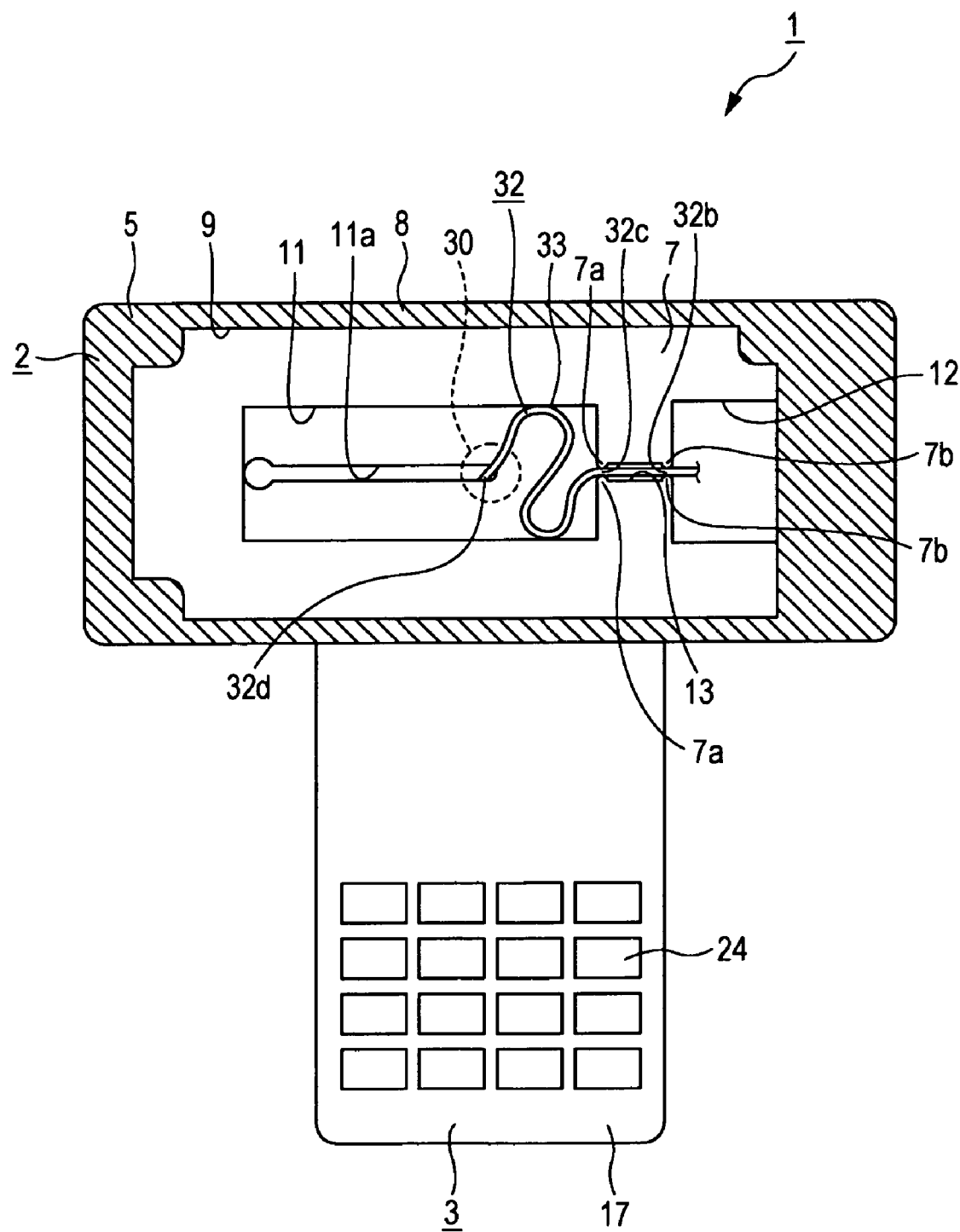
FIG. 16 is a front view showing the connecting cable when the first housing is rotated and showing part of the first housing in cross section.

When the first housing 2 is rotated with respect to the second housing 3 in the opening position toward a rotational position, the connecting cable 32 is rotated together with the first housing 2 by using the intermediate section 32d held by the holding member 30 as a pivot (see FIG. 16). At this time, since the connecting cable 32 is held by the holding hole 31 of the holding member 30 which functions as a rotation pivot section, the connecting cable 32 is rotated together with the first housing 2 with the S-shaped state thereof being kept and with no change in the bent state thereof.

When the first housing 2 is rotated with respect to the second housing 3 to the rotational position, the click spring 28 is temporarily moved out of engagement with the engagement holes 27b, 27b, . . . , and, when the first housing 2 is rotated to the rotational position, the click spring 28 engages into the engagement holes 27b, 27b, . . . again. As a result, the first housing 2 is held in the rotational position.

When the first housing 2 is rotated from the rotational position to the opening position, the connecting cable 32 is also rotated together with the first housing 2 with the S-shaped state thereof being kept and with no change in the bent state thereof.

When the first housing 2 slides from the opening position to the closing position, since the intermediate section 32c of the connecting cable 32 held by the first holding sections 7a and 7a is moved downward, the connecting cable 32 becomes a vertical straight line as a result of the bendable section 33 bent in the S-shaped state being extended in the storage concave section 11 (see FIGS. 3 and 5).

The above description is made with respect to a case in which the first holding sections 7a and 7a which hold the intermediate section 32c of the connecting cable 32 are provided in positions which are away from each other in a horizontal direction and are the same in a vertical direction. The first holding sections 7a and 7a can be provided in positions which are away from each other in a horizontal direction and are different in a vertical direction, for example (see FIG. 17).

Figure 17:
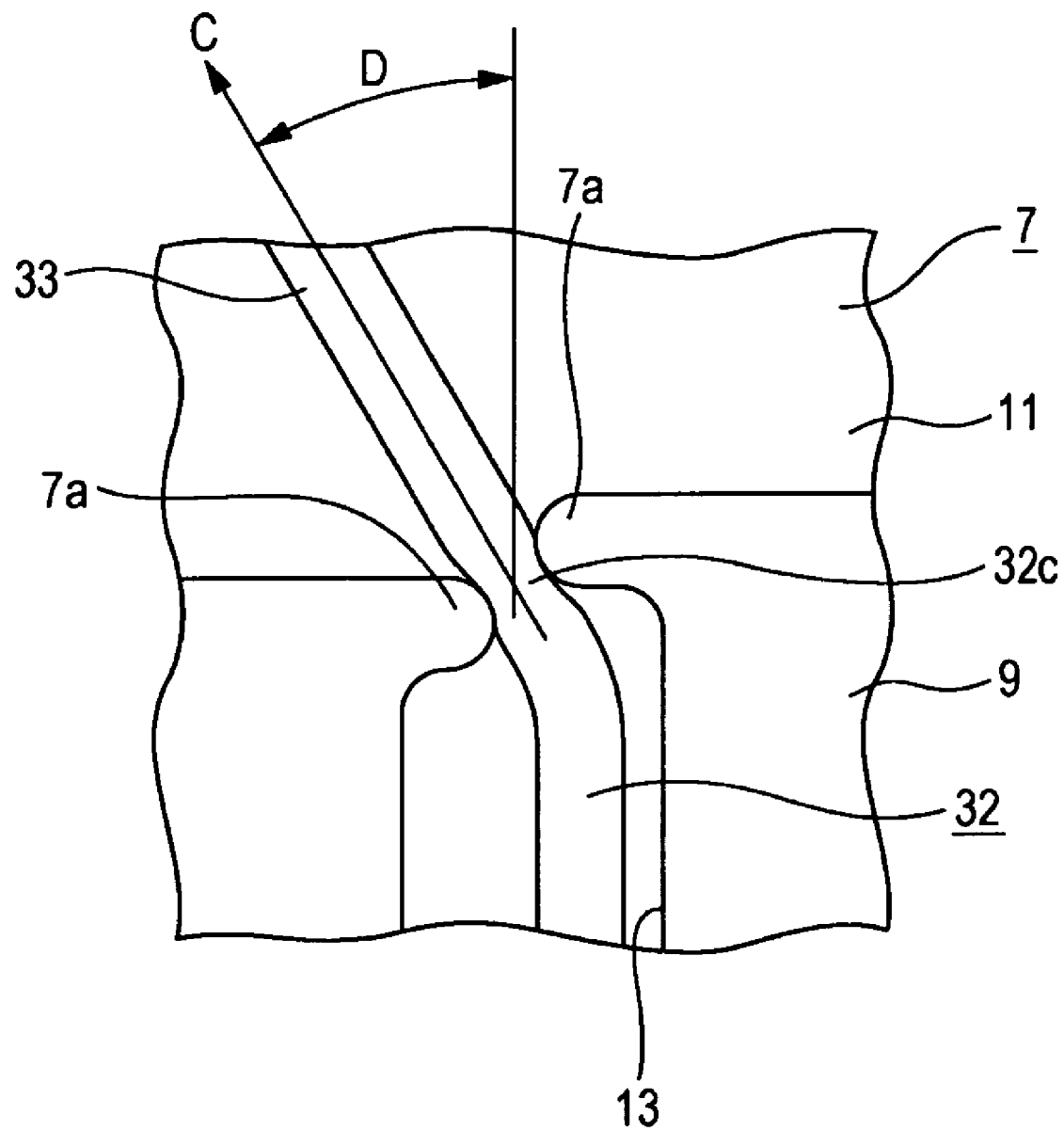
FIG. 17 is an enlarged front view showing an example in which a first holding section is provided in different positions in a vertical direction.

As described above, by providing the first holding sections 7a and 7a in different positions in a vertical direction, a direction in which the connecting cable 32 is bent can be set in advance so as to be a predetermined direction (a direction C in FIG. 17). This makes it possible to set the direction in which the connecting cable 32 is bent at a given direction with reliability. It is preferable that the positions of the first holding sections 7a and 7a be set so that an angle D in the direction C with respect to the vertical direction becomes 20° to 40°, for example.

Figure 18:
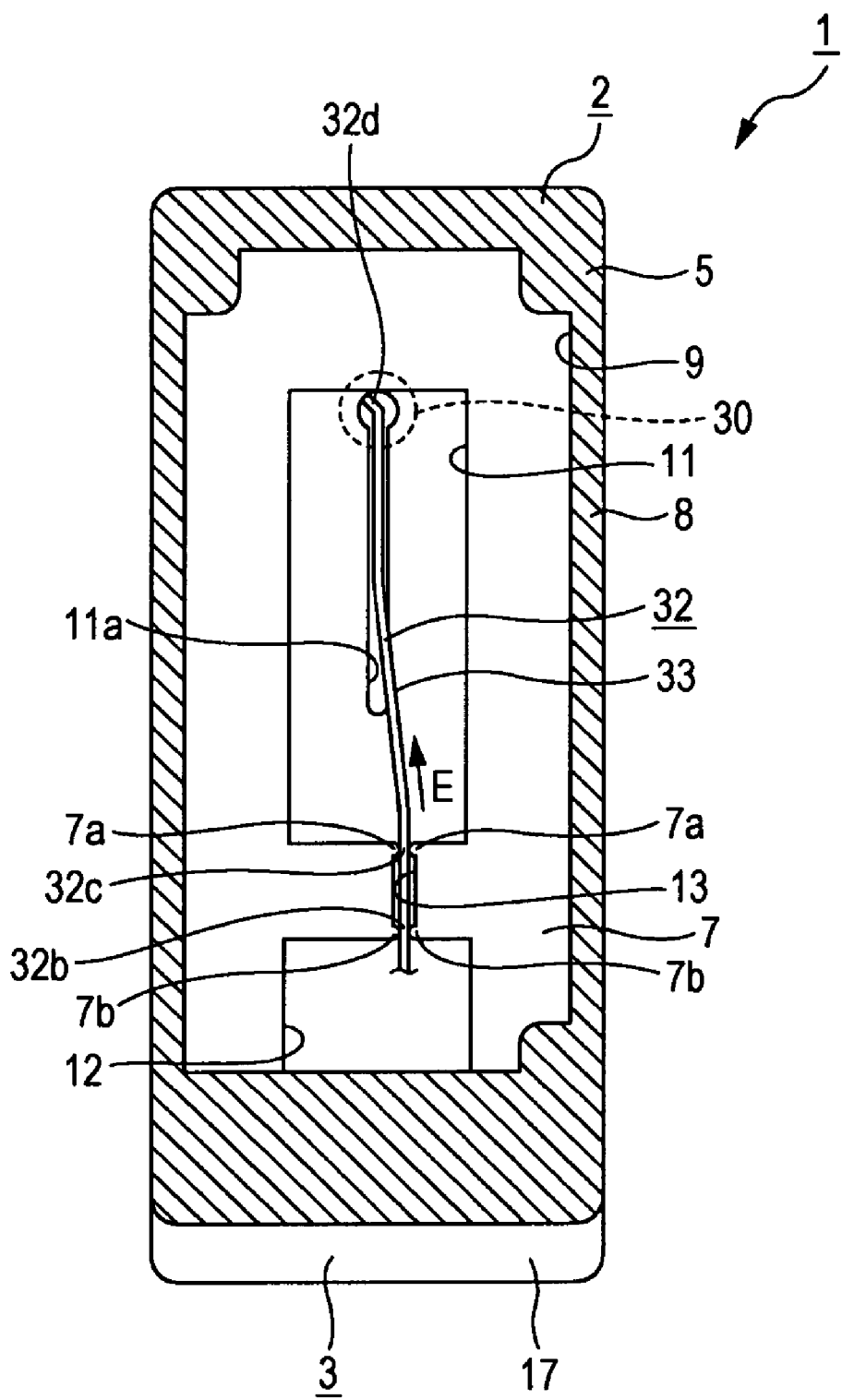
FIG. 18 is an enlarged front view showing an example in which a first holding section and a second holding section are provided in different positions in a horizontal direction.

Moreover, for example, it is also possible to provide the first holding sections 7a and 7a and the holding hole 31 of the holding member 30 functioning as the second holding section in positions which are away from each other in a vertical direction and are different in a horizontal direction (see FIG. 18).

As described above, by providing the first holding sections 7a and 7a and the holding hole 31 of the holding member 30 functioning as the second holding section in positions which are different in a horizontal direction, a direction in which the connecting cable 32 is bent can be set in advance so as to be a predetermined direction (a direction E in FIG. 18). This makes it possible to set the direction in which the connecting cable 32 is bent at a given direction with reliability.

Conclusion

As described above, in the portable terminal device 1, when the first housing 2 slides with respect to the second housing 3, the bendable section 33 of the connecting cable 32 is bent and extended in a direction orthogonal to a direction in which the first housing 2 slides and is orthogonal to a thickness direction.

Therefore, it is not necessary to prepare a space in which the connecting cable 32 is bent in the thickness direction of the first housing 2 and the second housing 3. This makes it possible to reduce the thickness of the portable terminal device 1.

Moreover, the connecting cable 32 is not folded or extended greatly in the thickness direction of the first housing 2 and the second housing 3 each time the first housing 2 slides. This makes it possible to improve the durability of the connecting cable 32.

Furthermore, in the portable terminal device 1, since the connecting cable 32 is held in the holding hole 31 of the holding member 30 functioning as a rotation pivot section of the first housing 2 with respect to the second housing 3, the bent state of the connecting cable 32 is not changed when the first housing 2 is rotated with respect to the second housing 3.

Therefore, also in a case in which the first housing 2 is rotated with respect to the second housing 3, it is possible to reduce the thickness of the portable terminal device 1 and improve the durability of the connecting cable 32.

Furthermore, since the inclined surface 31a which is inclined at a predetermined angle with respect to the thickness direction is formed in the holding hole 31 of the holding member 30 functioning as the second holding section, it is possible to set the direction in which the connecting cable 32 is bent at a given direction with reliability.

Moreover, since the storage concave section 11 in which the bendable section 33 of the connecting cable 32 is stored is formed in the portable terminal device 1, the storage space in which the bendable section 33 is stored is limited to a given range. This makes it possible to reduce the size of the portable terminal device 1.

In addition, as described earlier, in the portable terminal device 1, the length of the bendable section 33 of the connecting cable 32 is 1.3 to 1.6 times the maximum stroke of the first housing 2 when the first housing 2 slides with respect to the second housing 3. Therefore, it is possible to ensure a good storage state of the bendable section 33 without applying heavy load to the bendable section 33 in the entire range from the closing position to the opening position of the first housing 2.

The above description is made with respect to a case in which the bendable section 33 of the connecting cable 32 is bent and extended inside the first housing 2. However, the part in which the bendable section 33 is bent and extended is not limited to the inside of the first housing 2, and it is also possible to adopt a structure in which the bendable section 33 is bent and extended inside the second housing 3.

In this case, the storage concave section 11 in which the bendable section 33 is stored is formed inside the second housing 3.

It is to be understood that the specific shapes and structures of the component elements shown in the preferred embodiment described above are merely examples of how the present invention is implemented and thus are not meant to limit the technical scope of the invention in any way.

What is claimed is:

1. A portable terminal device, comprising:
   a first housing in which at least a display section is placed;
   a second housing supporting the first housing slidably in a predetermined direction and in which at least an operation section is placed;
   a first circuit board placed inside the first housing and on which a first connector is mounted;
   a second circuit board placed inside the second housing and on which a second connector is mounted; and
   a connecting cable placed inside the first housing and the second housing and having one end connected to the first connector and the other end connected to the second connector; wherein
   at least part of the first housing and at least part of the second housing are placed one on top of another in a thickness direction,
   a first holding section and a second holding section are provided inside at least one of the first housing and the second housing so as to hold two portions in an intermediate section of the connecting cable away from each other in a direction in which the first housing slides with respect to the second housing, and
   when the first housing slides with respect to the second housing, a portion of the connecting cable between the first holding section and the second holding section is bent and extended in a direction which is orthogonal to the direction in which the first housing slides and is orthogonal to the thickness direction.

2. The portable terminal device according to claim 1, wherein
   the first housing is rotatably supported on the second housing in a plane orthogonal to the thickness direction, and
   a holding hole which holds the intermediate section of the connecting cable and functions as the second holding section is formed inside a rotation pivot section of the first housing with respect to the second housing.

3. The portable terminal device according to claim 2, wherein
   a cylindrical holding member having the holding hole is provided in the rotation pivot section, and
   the holding hole is inclined at a predetermined angle with respect to the thickness direction.

4. The portable terminal device according to claim 1, wherein
   a storage concave section in which a portion of the connecting cable between the first holding section and the second holding section is stored is formed in one of the first housing and the second housing.

5. The portable terminal device according to claim 1, wherein
   the length of the portion of the connecting cable, the portion being held by the first holding section and the second holding section, is 1.3 to 1.6 times a maximum stroke of the first housing when the first housing slides with respect to the second housing.

6. The portable terminal device according to claim 1, wherein
   the first holding section and the second holding section are provided so as to be away from each other in a direction which is orthogonal to the direction in which the first housing slides and is orthogonal to the thickness direction.

* * * * *